May 14, 1963     J. M. GAGE     3,089,592
SEED CLEANER

Filed April 1, 1960     2 Sheets-Sheet 1

INVENTOR.
Jerome M. Gage
BY
Sam J. Slotsky
ATTORNEY

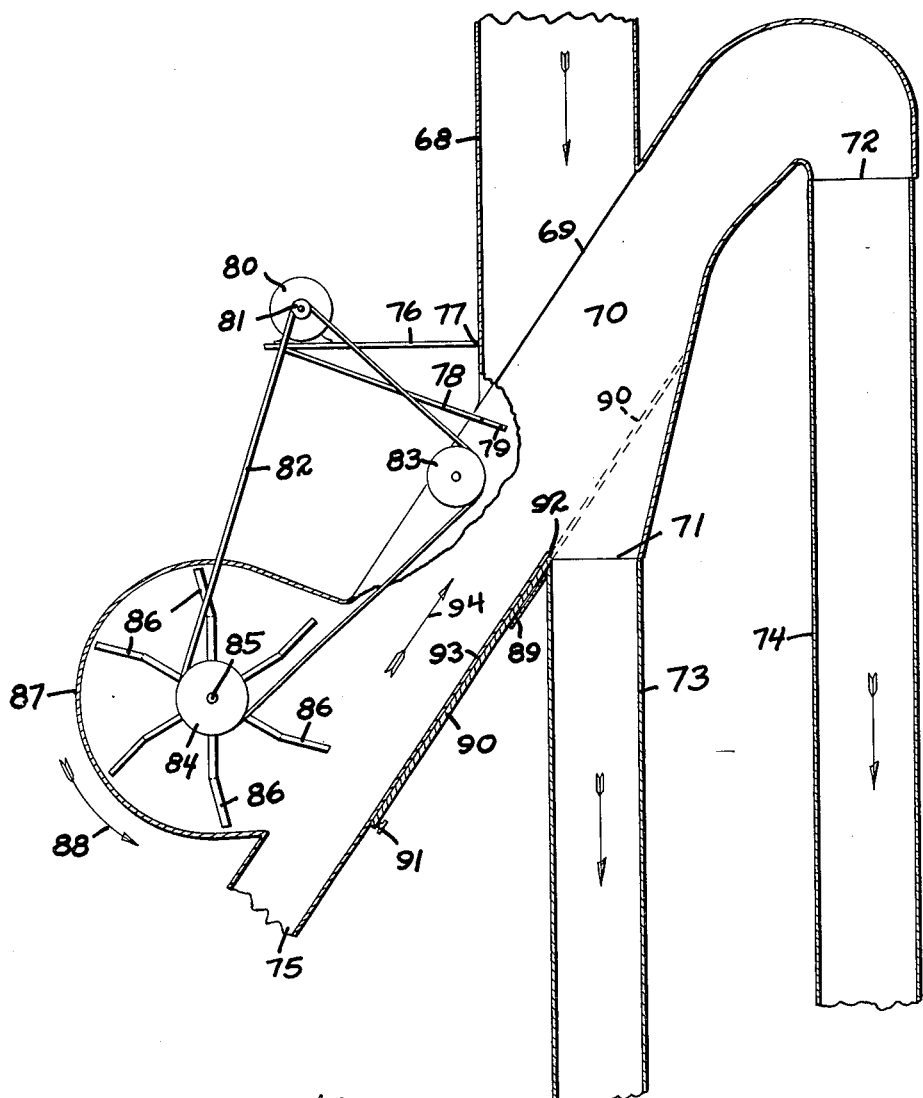

United States Patent Office 3,089,592
Patented May 14, 1963

3,089,592
SEED CLEANER
Jerome M. Gage, Sioux Falls, S. Dak., assignor to
M. L. Kollman, Iowa City, Iowa
Filed Apr. 1, 1960, Ser. No. 19,418
1 Claim. (Cl. 209—34)

My invention pertains to a seed cleaner.

An object of my invention is to provide a seed cleaner which will efficiently and uniformly separate seed from chaff and other materials with which said seed is commonly associated.

A further object of my invention is to provide a rotating arrangement through which the rough material is passed, and with gradually increasing openings so that the separation is made practically complete, and with the rotating screens and perforated structure providing means whereby the separated material can be drawn off at a variety of spaced locations.

A further object of my invention is to provide a still further seed cleaning operation in which the function of forced air is applied to re-clean and re-process the material so that as a result the refinement necessary to provide a completely clean seed is provided.

A further object of my invention is to provide adjustable means in the above mentioned re-processing structure.

A further object of my invention is to provide a replaceable screen structure.

Figure 1:
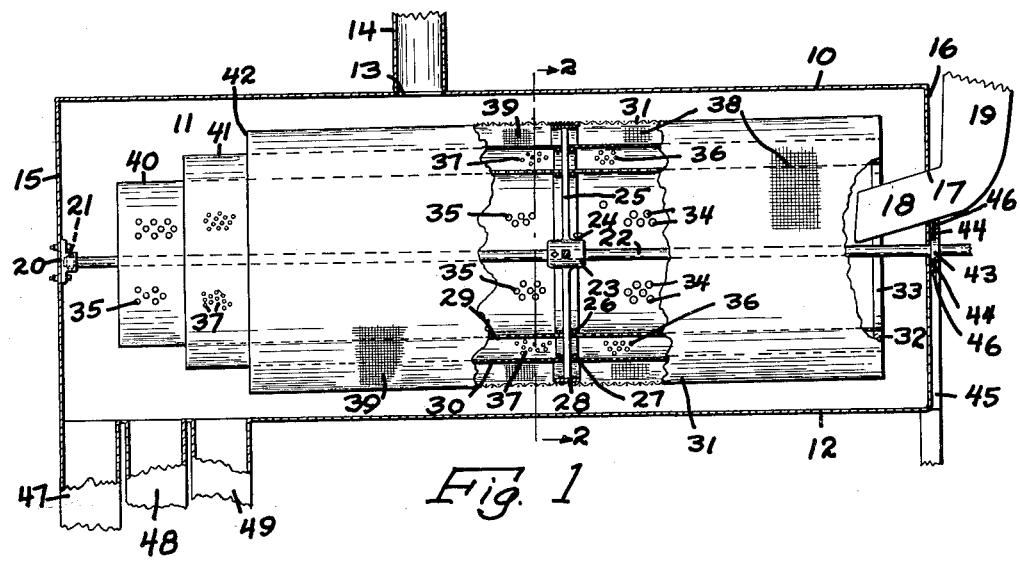
Figure 2:
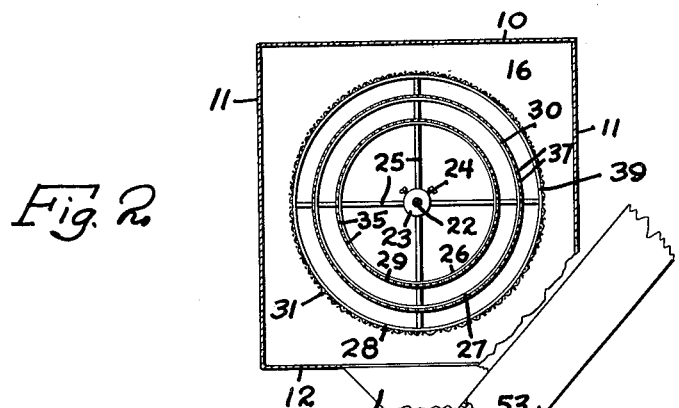
Figure 3:
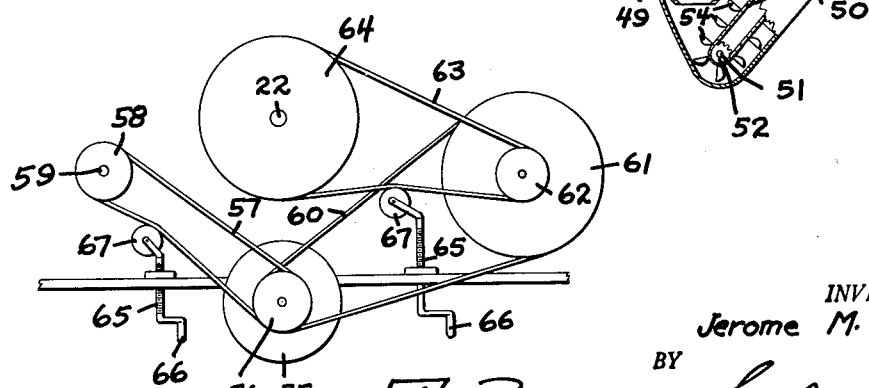

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

FIGURE 1 is a longitudinal section of the major portion of the seed cleaner with fragmentary sections, FIGURE 2 is a sectional view taken generally along the lines 2—2 of FIGURE 1, FIGURE 3 is a forward elevation of a portion of the driving mechanism, and FIGURE 4 is an enlarged sectional detail of the re-cleaning and re-processing device.

My invention contemplates the provision of a seed cleaning arrangement in which the rough material containing the seed, sticks, weeds and all other extraneous matter can be effectively separated so that as its final result the seed will be completely clean from such other matter. It will be realized, of course, that the machine of my invention will also pertain to other materials as well, and wherein the separation of such materials can be provided by the same process and apparatus.

I have used the character 10 to designate the top wall of a substantially square in cross-section casing having side walls 11 and a bottom wall 12.

Communicating at 13 with this casing is a pipe or similar structure 14 which communicates with a suitable suction apparatus.

The pipe and the suction apparatus is adapted merely to draw off any loose particles or chaff from the machine.

The character 15 indicates an end wall, and the character 16 a further end wall through which communicates at 17 the end portion 18 of a chute 19, the chute 19 being adapted to receive by any suitable means the rough material containing the seed which is to be cleaned.

The character 20 designates an end bearing which is secured to the end wall 15, this bearing including the flexible joint at 21, the character 22 designating a shaft, the end of which is received in the bearing 21 and which will thereby allow pivotal movement of the shaft at this point.

Attached to the shaft 22 are a series of spaced collars 23 which include the lock screws 24 for attaching the collars to the shaft, and attached to and extending from the collars 23 are the radially positioned spokes 25 which pass through the various rings 26, 27 and 28. It will be understood as explained above that there will be provided several of the spaced collars 23 to separate the screens and perforated cylinders about to be described.

Attached to the rings 26 is an inner cylindrical member 29, and attached to the rings 27 is a further cylindrical member 30, and attached to the rings 28 is a cylindrical mesh screen structure 31. These various cylindrical members are suitably attached to an end ring 32 having a circular opening at 33 through which the chute portion 18 communicates.

The inner cylindrical member 29 includes a portion having the larger openings 34, which openings extend from the end ring 32 to substantially midway of the cylinder 29, and the other end of the cylinder 29 includes the openings 35 which are slightly smaller than the openings 34.

The cylindrical member 30 includes the further openings 36 which are slightly smaller than the openings 35, which openings 36 also extend from the ring 32 to substantially midway of the screen 30, and the other end of the cylindrical member 30 includes the further small openings 37 which are smaller than the openings 36. The screen 31 includes the coarser mesh openings 38 extending from the ring 32 to the mid portion thereof, and the finer mesh portion 39 extending to the other end of this screen. The various openings and meshes extend throughout the entire length of the various cylinders and screens, only a few openings being shown for clarity, it being thereby understood that all of the various cylindrical members are completely perforate throughout their lengths.

The inner cylindrical member 29 includes an end portion 40 which extends beyond the further extending portion 41 of the cylinder 30, which portion 41 extends a certain distance from the end 42 of the outer screen structure.

The shaft 22 is journalled within a bearing 43 which is secured by the bolts 44 to the vertical framework portion 45, the bolts 44 being secured within the vertical slots 46. The character 47 designates a vertically positioned chute communicating through the lower casing wall 12, the character 48 designates a further chute, and the character 49 a still further chute.

Communicating with the chute 49 (see FIGURE 2) is an angularly positioned casing 50 which includes a shaft 51 attached to a sprocket 52, and engaging the sprocket 52 is a sprocket chain 53 to which are attached the conveying paddles 54.

FIGURE 3 shows a somewhat schematic part of the driving arrangements. In FIGURE 3 the character 55 indicates an electric or other motor driving a pulley 56 over which passes the belt 57 which engages a further pulley 58 which drives a shaft 59, which shaft 59 drives any suitable motor and suction arrangement (not shown)

which can be used to apply suction through the pipe 14, and a further pulley directly adjacent to the pulley 56 drives a further belt 60 which engages the larger pulley 61 which is attached to the smaller pulley 62, and passing over the pulley 62 is the belt 63 which drives the pulley 64, which pulley 64 is attached to the shaft 22. The character 65 indicates adjustable threadable units having the handles 66 and the pulleys 67 which can be used to take up the slack in the various belts as shown.

In referring to FIGURE 4, the character 68 indicates a vertically positioned chute which will communicate with the upper end of the chute 50, the chute 68 communicating at 69 with the angularly inclined further chute 70 including openings at 71 and 72, which openings communicate with the vertically positioned chute members 73 and 74.

The chute member 70 communicates with a discharge portion 75.

The character 76 indicates a platform attached at 77 to the chute 68 and attached to the platform 76 is a bracing member 78 which is attached at 79 to the sides of the chute 70, and mounted on the platform 76 is an electric motor 80 which is attached to the pulley 81, and passing over the pulley 81 is the belt 82 which passes over a further pulley 83 which is secured to the chute 70, and the belt 82 also passes over a still further pulley 84 attached to the shaft 85, and attached to the shaft 85 are the radially positioned paddles 86 which rotate within the housing 87 which communicates with the chute 70, the paddle 86 being adapted to rotate in the direction of the arrow 88.

The character 89 indicates a keeper with which is slidably engaged a flat gate 90 to which is attached the handle 91, the gate 90 being adapted to pass through the opening 92, which opening is positioned between the chute 73 and the wall 93, which wall 93 is a portion of the chute 70.

The seed cleaner operates in the following manner. The bearing 43 is placed at a higher elevation than the end bearing 20 so that the left hand end of the various cylinders will be lower than the right hand end, or in other words, the cylindrical structure will slope downwardly toward the left hand end, or toward the end having the various chutes 47, 48 and 49. The vertical height of the bearing 43 can be adjusted when desired consistent with the type of material which is to be separated, or wherein it may be desired to control the speed of separation. The rough material containing the seed, weeds, sticks, etc. is elevated to the chute portion 19 and this material will then pass in through the hollow opening at 33 into the inner cylinder 29. The material which will be the coarsest material containing weeds, sticks, etc. will pass to the extreme open left hand of the cylinder 29 and will drop downwardly into the chute 47, since this material will not pass through the openings 34 and 35.

Correspondingly, the next larger sizes of the coarser material will pass through the open end of the cylinder 30 and downwardly through the chute 48 since these sizes will not pass through the openings 36 and 37, these coarser portions being gathered from the chutes 47 and 48 in any suitable containers for re-processing.

The finer products such as the seed and merely very small pieces of chaff and the like, will pass through the end of the screen structure 31 into the chute 49 since these smaller particles will not pass through the meshes 38 and 39, it being noted that the annular end spaces between the portions 40 and 41, and between 41 and the screen 31, are completely open.

It will also be noted that the progressive diminution of the various opening sizes 34, 35, 36, 37, 38 and 39 will provide an added effect for providing more complete separation since the material will be gradually and uniformly sifted as the material passes through these openings, and as it progressively passes toward the left of the arrangement. This is due to the fact that the openings 34, 36 and 38 are gradually smaller in size, as are the openings 35, 37 and 39.

The products which pass through the screen structure shown in FIGURES 1 and 2 will next pass through a further process which is provided in the structure shown in FIGURE 4. These products pass through the chute 49 (see FIGURE 2) and then pass upwardly through the chute 50 where they are then discharged into the chute 68 through the opening 69 into the inclined chute 70.

The paddles 86 are rotating in the direction of the arrow 88, an air stream will be provided upwardly in the direction of the arrow 94, which air stream will provide further functions which will be explained. The heavier individual seeds, however, will gravitate against this stream through the bottom portion 75, which seed can be discharged into any suitable receptacle, and which will then be the completely refined product, or the desired seed itself, and which will usually not require re-processing.

The air stream passing upwardly in the direction of the arrow 94 will provide means for forcing or blowing the lighter chaff particles and the like upwardly until they reach the opening 72 wherein they will be discharged by gravity, etc. into the chute 74, which products may be re-run, but which products, however, will be rarely re-run through the entire process, only when necessary to get any possible seed products out of the same.

Further products will not rise to the heighth above described but will pass downwardly through the chute 73, these products being re-run when necessary, depending upon whether these products contain sufficient seed for this purpose.

The gate 90 provides an important function in that it will regulate the pressure and volume of air passing upwardly in the direction of the arrow 94, by merely regulating the size of the opening above the opening 71 since the positioning of the gate 90 above the opening 71 will have the effect of reducing or increasing the air pressure passing upwardly.

The upper edge of the gate 90 is usually at a higher elevation than that shown in FIGURE 4, however, the gate can be completely closed as shown by the dotted structure. In other words, the volume and pressure of the air stream can be regulated by the gate 90, which volume and pressure is regulated according to the type of seed and the like.

It will be noted that the collars 23 and the spokes 25 provide means whereby the screen structures can be removed from, or replaced on, the shaft 22.

It will now be noted that I have provided the advantages mentioned in the objects of my invention with further advantages being apparent.

Some changes may be made in the construction and arrangement of the parts of my invention without departing from the real spirit and purpose of my invention, and it is my invention to cover by my claim any modified forms of structure or use of mechanical equivalents which may be reasonably included within their scope.

I claim as my invention:

A seed cleaner comprising a casing, a plurality of concentric cylindrical screens mounted for rotatable movement in said casing, said screens including an innermost screen, a next outer screen, and an outer screen, the innermost screen projecting beyond the limits of the next outer screen, the next outer screen projecting beyond the limits of the last outer screen, a plurality of discharge chutes communicating to the projecting portions of said screens, a shaft on which said concentric screens are mounted, means for adjustably positioning the vertical height of one end of said shaft whereby said screens will slope downwardly toward said discharge chutes, said innermost screen having a discharge end section and a forward section, and having a plurality of openings throughout, the openings in said discharge end section being smaller than the openings in said forward section, said next outer screen having a further discharge end section, and a further forward section and having a plurality of further openings throughout, the further openings in said further discharge end section being smaller than the further openings in said further forward section, said outer screen having a still further discharge end section, and a still further forward section, and having a plurality of still further openings throughout, the still further openings in said still further discharge end section being smaller than the openings in said still further forward section, the openings in said innermost screen being larger than the openings in said next outer screen, and the openings in said next outer screen being larger than the openings in said outer screen, a further seed cleaner communicating with the innermost of said discharge chutes, said further seed cleaner including an angularly positioned housing, said housing having an upper discharge opening and an intermediate discharge opening, vertically positioned further discharge chutes communicating with said further discharge openings, means for creating a stream of air passing upwardly along said angularly positioned housing, a slidable gate positioned within said intermediate opening to regulate said stream of air, the lower end of said angularly positioned housing providing means for passage of seed therethrough.

References Cited in the file of this patent

UNITED STATES PATENTS

| | | |
|---|---|---|
| 246,237 | Roberts | Aug. 23, 1881 |
| 297,761 | Case | Apr. 29, 1884 |
| 532,266 | Cuplin | Jan. 8, 1895 |
| 730,229 | Burr | June 9, 1903 |
| 761,453 | Dean | May 31, 1904 |
| 896,888 | Brubaker | Aug. 25, 1908 |
| 1,053,410 | Liden | Feb. 18, 1913 |
| 1,693,001 | Smith | Nov. 27, 1928 |
| 1,793,017 | Runge | Feb. 17, 1931 |

FOREIGN PATENTS

| | | |
|---|---|---|
| 471,273 | Canada | Feb. 6, 1951 |
| 1,052,415 | France | Jan. 25, 1954 |